(12) United States Patent
Moross et al.

(10) Patent No.: US 8,836,971 B2
(45) Date of Patent: Sep. 16, 2014

(54) PRINTING PROCESSES AND PRINTED PRODUCTS

(75) Inventors: Richard Moross, London (GB); Stefan Magdalinski, London (GB)

(73) Assignee: Moo Print Limited, London (GB)

( * ) Notice: Subject to any disclaimer, the term of this patent is extended or adjusted under 35 U.S.C. 154(b) by 1620 days.

(21) Appl. No.: 12/300,062

(22) PCT Filed: May 9, 2007

(86) PCT No.: PCT/GB2007/001706
§ 371 (c)(1),
(2), (4) Date: Jun. 30, 2009

(87) PCT Pub. No.: WO2007/129102
PCT Pub. Date: Nov. 15, 2007

(65) Prior Publication Data
US 2009/0303523 A1   Dec. 10, 2009

(30) Foreign Application Priority Data
May 9, 2006   (GB) .................................. 0609170.6

(51) Int. Cl.
*G06F 3/12*    (2006.01)
*G06F 17/21*   (2006.01)

(52) U.S. Cl.
CPC ..................................... *G06F 17/21* (2013.01)
USPC .......................................................... 358/1.15

(58) Field of Classification Search
None
See application file for complete search history.

(56) References Cited

U.S. PATENT DOCUMENTS

| 5,465,299 | A  | * | 11/1995 | Matsumoto et al. | 713/176 |
| 6,650,433 | B1 | * | 11/2003 | Keane et al. | 358/1.15 |
| 6,959,382 | B1 | * | 10/2005 | Kinnis et al. | 713/170 |
| 7,149,709 | B1 | * | 12/2006 | Lopez, Jr. | 705/26.5 |
| 7,207,001 | B2 | * | 4/2007  | Bailey et al. | 715/234 |

FOREIGN PATENT DOCUMENTS

| WO | 01/55869 A1 | 8/2001 |
| WO | 01/96118 A  | 12/2001 |

* cited by examiner

*Primary Examiner* — Benny Q Tieu
*Assistant Examiner* — Sunil Chacko
(74) *Attorney, Agent, or Firm* — Stevens & Showalter, LLP

(57) ABSTRACT

A system for generating an electronic document for use in a printing process is described. The electronic document comprises a plurality of printable sheets, and each printable sheet comprises an array of printable regions. The system comprises receiving means arranged to receive content for each of a plurality of users and assigning means arranged to assign a selection of printable regions for each user in dependence on the received content for each user and to assign the content for each user amongst the selection of printable regions assigned to that user. The system is arranged to receive the content and assign a selection of printable regions such that the content for each user, varies across the selection of printable regions assigned to that user.

39 Claims, 13 Drawing Sheets

1

PRINTING PROCESSES AND PRINTED PRODUCTS

TECHNICAL FIELD

The present invention relates to improvements relating to printing processes and printed products. In particularly, though not exclusively the present invention relates to a system for generating an electronic document for printing which receives content from a number of users. More particularly, the invention enables users to print a selection of highly personalised print matter.

BACKGROUND TO THE INVENTION

Generally in the art of printing processes there are two methods of printing products. Firstly, there is domestic printing using domestic home printers, which may or may not be able to print in colour. These printers are affordable, but a user is limed to the materials they can print on (paper or very thin card). Typically, the print quality using domestic home printers is relatively low, and the print speed is relatively slow. The advantage of domestic printing is that a user is able to print highly personalised matter relatively inexpensively: albeit possibly at a lower than desired quality.

If a user wishes better quality printing, they must employ a professional printer which is expensive, or purchase a better printer which can be very expensive.

When using professional printers, it is typical to print identical products because it is costly to change the set-up of the printers between print runs. As a result, the cost of printing may vary depending on the number of items being printed, i.e. the cost per item of printing a small number of items may be considerably more than the cost per item when printing a large batch of identical items. Alternatively, it is common for professional printers to stipulate a minimum order number and as a result professional printing may result in the manufacturing/printing of a much larger number of items than is actually required, adding to the cost of the required items.

It is a further disadvantage that the lack of personalisation and large batch sizes may result in printed information going out of date before the quantity of printed matter has been used. For example, business cards are typically produced in large quantities. However, if the details on business cards change often, i.e. address details, telephone numbers, qualifications, job titles, then it is feasible that a large number of business cards are wasted because they contain out-of-date information.

What is needed in the art is a way in which very high quality printed products can be manufactured using professional printers, but where the products can be highly personalised or different to each other. Furthermore batch size should be unimportant, meaning that one-off products can be made in amongst larger batches without increasing the cost of production: thereby improving flexibility while maintaining efficiency and speed without increasing production costs.

SUMMARY OF THE INVENTION

According to a first aspect of the invention there is provided a system for generating an electronic document for use in a printing process, wherein the electronic document comprises a plurality of printable sheets, each printable sheet comprising an array of printable regions, the system comprising: receiving means arranged to receive content for each of a plurality of users; assigning means arranged to assign a selection of printable regions for each user in dependence on the received content for each user and to assign the content for each user amongst the selection of printable regions assigned to that user, wherein the content for each user, varies across the selection of printable regions assigned to that user.

One advantage of the above aspect is that it enables highly personalised and individual content of a plurality of users to be assigned within an electronic document for printing, which is not restricted to fixed batch sizes. This can be effected at a low-cost, in a fast and efficient manner and at high quality.

Preferably, the content comprises region specific content that is specific to each printable region within the selection of printable regions.

Typically, the region specific content comprises image data and format information.

In a preferred embodiment, the receiving means is arranged to receive a plurality of content files from a remote terminal of a user.

Preferably, the system further comprises a data store for storing the received content files in a database.

In a further preferred embodiment, the content is stored on a remote server and the receiving means is further arranged to receive a link to the content stored on the remote server such that the receiving means can access the content.

The links may be to the received content files stored in the database. Alternatively, the links are URLs of content files stored at the remote server. It is to be appreciated that in one embodiment some content may be linked to the database and some content may be linked to the remote server.

In a preferred embodiment, the URL links include links to metadata associated with each content file.

The content files may comprise image files. Although, the content files may be any file which is capable of being represented visually for inclusion within the electronic document which is to be printed.

In a preferred embodiment, the system further comprises a graphical user interface (GUI) tool arranged to permit user selection of the content. The GUI tool advantageously facilitates the selection of content in a simple and straightforward manner.

In a further preferred embodiment, the system further comprises an image processor arranged to permit user selection of one or more image processing techniques to be applied to an image specified in the image files. The system advantageously permits users to alter any image file which has been selected.

Optionally, the image processing techniques may be selected from a group comprising: magnification, rotation, contrast control, brightness control, colour control, red-eye reduction. However, it is to be appreciated that additional image processing techniques may be provided for by the system.

In a preferred embodiment, user selection of content comprises user selection of a plurality of images, the system further comprising an image portion selection tool for enabling user selection of a printable portion of each of the selected plurality of images wherein the printable portion equates to a printable region. Permitting the selection of a portion of a selected image advantageously allows a user to select just an area of interest within an image to be printed.

Preferably, the system further comprises a personalisation tool arranged to permit personalisation content to be added to at least one of the printable regions.

Optionally, the personalisation content is selected from one or more of the group comprising: an image, an icon, free text, text from metadata associated with a related content file, text stored in a user data section of the database, and symbols. The personalisation content may be different across a range of printable regions assigned to a user and permits users to decide what information they wish to be printed within the printable regions. One advantage of this system is that it allows a user to obtain a plurality of printed objects, e.g. cards, but that not all of the cards need to have the same information printed on them. For example, the user can select some cards to be printed with the user's mobile phone number and others with just an e-mail address, all within one selection of printable regions (i.e. order/batch). As a result, the user is given greater flexibility regarding how they distribute personal information.

Typically, the personalisation tool is arranged to permit the user to specify a format for the personalisation content by selecting personalisation content attributes selected from the group comprising: font type, font style, font size, and font colour.

Preferably, the personalisation content comprises at least one personalisation element, and wherein the personalisation tool is arranged to permit user selection of an X/Y co-ordinate of the personalisation element within the printable region.

Optionally, the personalisation tool is arranged to permit user selection of an orientation of the personalisation element within the printable region.

Advantageously, the user is able to select and format information which is to appear within the printable regions within the electronic document.

In one embodiment, all of the printable regions assigned to a user contain a portion of identical content. The portion of identical content may be one personalisation element applied across all of the printable regions assigned to that user. This embodiment advantageously makes the selection of content simple and efficient for a user when a lesser degree of individual personalisation is required.

In one embodiment, the GUI tool may be arranged to store the content for each printable region as a complete image.

In a preferred embodiment, the system further comprises a content collation tool arranged to collate content for each of the printable regions within the selection of printable regions; and a data store for storing the collation of content for the selection of printable regions.

Preferably, the content collation tool collates the content into an XML file associated with the group of printable regions, and wherein the XML file is stored in the data store.

Advantageously, the storing of a collation of content for the printable regions ensures efficient generation of the electronic document. Storing the collation of content as an XML file is a memory efficient method of storing the content since less memory is required to store a list of instructions relating to the content to be applied to a printable region than the storage of a complete image file. However, storage of complete image files is efficient in terms of the speed with which the electronic document may be created.

In a preferred embodiment, the system further comprises a position assigner arranged to assign an optimal position for the selection of printable regions, assigned to each user, within the electronic document, such that the optimal position for each user forms a specified order throughout the electronic document, the specified order being determined to enhance collection of the selection of printable regions at the end of the printing process.

Preferably, the collation tool determines user requisition information comprising delivery data and the number of printable regions in the selection of printable regions, such that the position assigner is further arranged to assign optimal positions for each selection of printable regions within the electronic document in dependence on the delivery data and number of printable regions of a plurality of users.

More preferably, the position assigner is arranged to record the optimal positions for each user in a data store, such that the position assigner may be further arranged to dynamically amend the specified order depending on the users that have content within the electronic document.

Advantageously, the system is able to assign a selection of printable regions within the print document to each user in a logical and efficient manner. Selections of printable regions being delivered to the same address can be located together. Also, selections of printable regions being delivered to specific regions may be assigned a position within an electronic document associated with that region, while printable regions being delivered to a different region may be assigned a position within an electronic document associated with that different region.

It is to be appreciated that users may add to the content of the electronic document at different times and so the optimal position may change as new content is added to the electronic document. The dynamic re-ordering of the specified order of positions advantageously ensures that selections of printable regions are always assigned the most optimal position within the electronic document.

In a preferred embodiment, the collation tool is arranged to use the user requisition information to generate a primary printable region containing an indication of the delivery data and a unique user ID to facilitate tracking of printable regions throughout the printing process.

Optionally, the primary printable region may contain a barcode of the delivery data and unique user ID, such that advantageously upon completion of the printing process, when one bar code within the electronic document is scanned, the system is notified that all of the selections of printable regions within that electronic document have been printed.

In a preferred embodiment, the GUI tool is arranged to permit a user to indicate that they have not finished selecting content, the GUI tool being further arranged to store the content selected at that stage, such that at a later time the content can be retrieved in order to facilitate completion of content selection by the user. Advantageously, the system enables user to return to their order such that it, may be completed and printed.

Preferably, the system further comprises organisation means arranged to organise the content within the selection of printable regions upon user selection of a desired layout of content.

In a preferred embodiment, additional content is applied to printable regions which are not assigned to a particular user, the additional content being selected from the group comprising promotional, advertising, and competition related content. It is to be appreciated that an administrator of the system may be able to indicate which additional content is to be applied to printable regions not currently assigned to a user. As such, the system is able to make use of printable regions which may otherwise not be used (i.e. the system reduces wastage).

Typically, the electronic document is a PDF file.

In a preferred embodiment, the system further comprises transmitting means arranged to transmit the electronic document to a remote print server using standard File Transfer Protocols for completion of the printing process.

Optionally, there may be a time delay between assigning content a position within the electronic document and transmitting a completed electronic document to the print server. This time delay ensures that users may be given the opportunity to make amendments/alterations to their selected content.

Preferably, the system further comprises printing means arranged to print the print document, comprising the plurality of printable areas, on to a plurality of sheets of printable material, stacking means arranged to place the printed sheets in a stack formation, cutting means arranged to cut the printable areas into their printable regions, to form columns of printable regions, wherein the selection of printable regions are placed within one column of printable regions such that the collection of the selection of printable regions is optimised.

Printing the electronic document, and arranging the sheets in a stack prior to cutting advantageously allows for the selection of printable regions to be ordered in such a way as to make the collection of the selection easier. In addition, this also advantageously increases the finished quality of the printable regions since cutting the selections in columns ensures that all of the printable regions within each column are substantially exactly the same size.

Typically, the content is assigned to both sides of the plurality of sheets.

In one embodiment, the assigning means is arranged to assign a selection of printable regions for each user such that the content contained within the arrays of at least two adjacent sheets is different to one another.

BRIEF DESCRIPTION OF DRAWINGS

Preferred embodiments of the invention will now be described, by way of example only, with reference to the accompanying drawings in which.

DETAILED DESCRIPTION OF PREFERRED EMBODIMENTS

Described below is an exemplary single installation (central server) embodiment of the present invention relating to a printing process associated with printing highly personalised cards. One function of the cards may be to provide a recipient of a card with personal information about the person issuing the card. However, it is to be appreciated that the present invention can be utilised for automatic printing of bespoke personalised matter including but not limited to:

Magazines, newspaper, catalogues, direct mail;
Business cards, tickets, money, gift vouchers;
Banners, posters, stickers, and badges;
Consumer packaging; and
Books, stationery, letters, annual reports.

Figure 1:
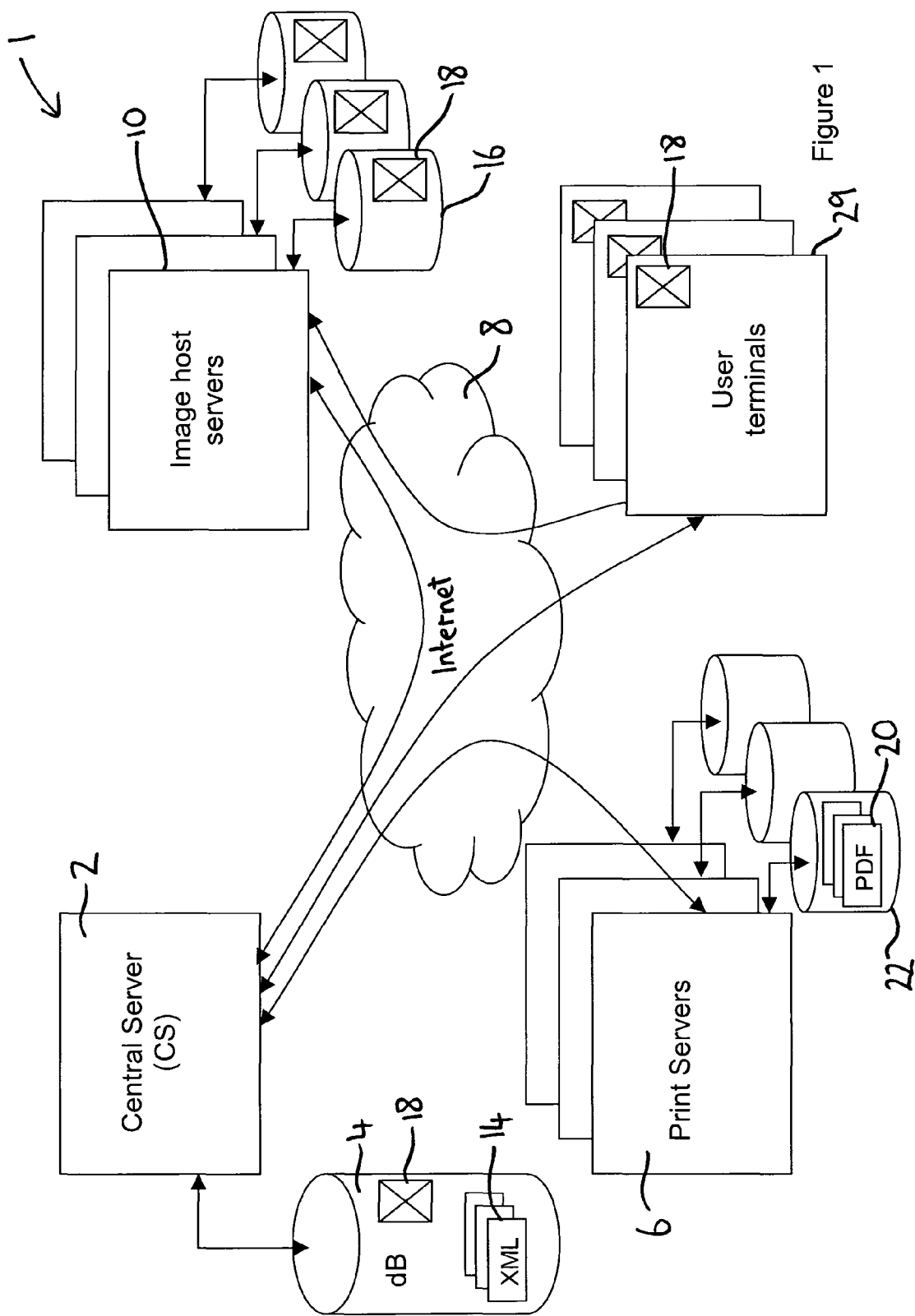
FIG. 1 is a schematic system diagram showing a central server (CS) embodying the present invention and connections between the central server via the Internet to remote user terminals, image host servers, and print servers.

FIG. 1 is an overview of an example environment 1 where the present embodiment operates. As shown, a central server (CS) 2 having an associated database 4, and a plurality of print servers (PS) 6 communicate with each other via the Internet 8. In addition, the central server 2 communicates with a plurality of image host servers (IH) 10 and a plurality of user terminals 12, also via the Internet 8.

The central server 2 has access to the database 4 which stores a plurality of XML files 14, and the plurality of image host servers 10 each have access to a respective database 16 which store image files 18. Examples of image host servers 10 include Flickr® and Bebo®.

Each XML file 14 stored at the database 4 relates to a print order from a user at a respective user terminal. The XML file 14 includes links (URLs) to image files 18 stored at a image host server 10.

The print servers 6 are situated where the printing physically happens, the print servers 6 receiving files (PDFs) 20 to be printed from the central server 2, and having a facility to store the received files 20 prior to printing in an associated memory store 22.

Figure 2:
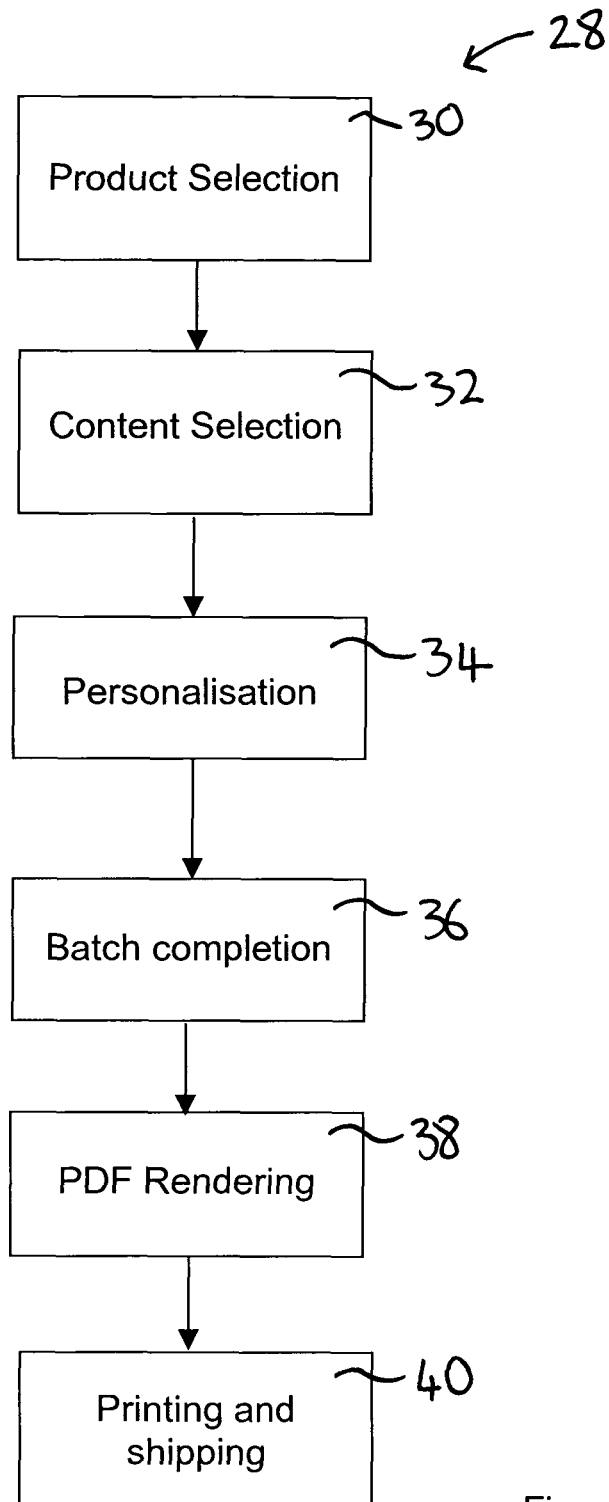
FIG. 2 is a flowchart showing an overview of the operation of an embodiment of the present invention shown in FIG. 1.

FIG. 2 shows a high-level overview 28 of the operation of the present embodiment. A user at a user terminal 29 selects, at step 30 a product, and quantity thereof, for printing (i.e. the print order known as a print set). The user then selects, at step 32, the content which is to be printed on the selected product. For example, a user wishing to purchase a plurality of cards may select the number they wish to purchase and will choose, at the content selection step 32, the images which are to appear on at least one side (i.e. the front) of the cards. As part of the content selection step 32, the user is able to perform image processing operations on the chosen images in order to customise the image they wish to appear on the printed card. For example, the user may wish to zoom in or out of the image and/or they may wish to rotate the orientation of the card i.e. from a substantially portrait view to a landscape view. It is to be appreciated that a vast number of image processing operations may be carried out and the present embodiment is not limited to the examples included here.

When the user is satisfied with the images they have selected, and have performed the desired image processing operations, they compose, at step 34, personalisation information which is to be printed on one or more surfaces of the card (typically the back of the cards). The personalisation information may include but is not limited to: name, address, e-mail address, telephone number, further images, logos, quotes, additional text, and/or website addresses. In one embodiment of the present invention, one or more of the cards in a print set may contain the same personalisation data, in order to streamline and simplify the selection and personalisation steps 32, 34. However, in another embodiment each individual card in the batch may contain different images on the front and different personalisation information on the back. The personalisation step also includes selection of font types, sizes, and colours for the text appearing on the back of the cards, including the location and orientation of the text.

When selection of personalisation information is complete, a user may be prompted to enter payment details and a shipping address for the print set, and the completed print set is written as an XML file 14, which is stored in the database 4. If the user is already registered, this information may already stored within database 4 for ease of retrieval.

Typically, a single user's order will not be sufficient to fill a complete print batch (i.e. a pre-determined number of sheets of print material). Therefore, a plurality of other users complete steps 30 to 34 until a sufficient number of print sets are completed in order to fill the print batch. The size of a print batch is typically predetermined. For example, the number of cards which fit on to one sheet of print material (i.e. card) is known, and the number of sheets within the print batch may be configured, for example at 100. The print batch is ordered and filled, at step 36, such that a plurality of print sets fill the batch in the most effective manner, i.e. making the best use of the 'spaces' within the batch. A PDF 20 is created, at step 38, using all of the XML files 14 within the print batch. The PDF 20 is then printed, at step 40, ready to be cropped into cards, packaged and shipped.

Figure 3:
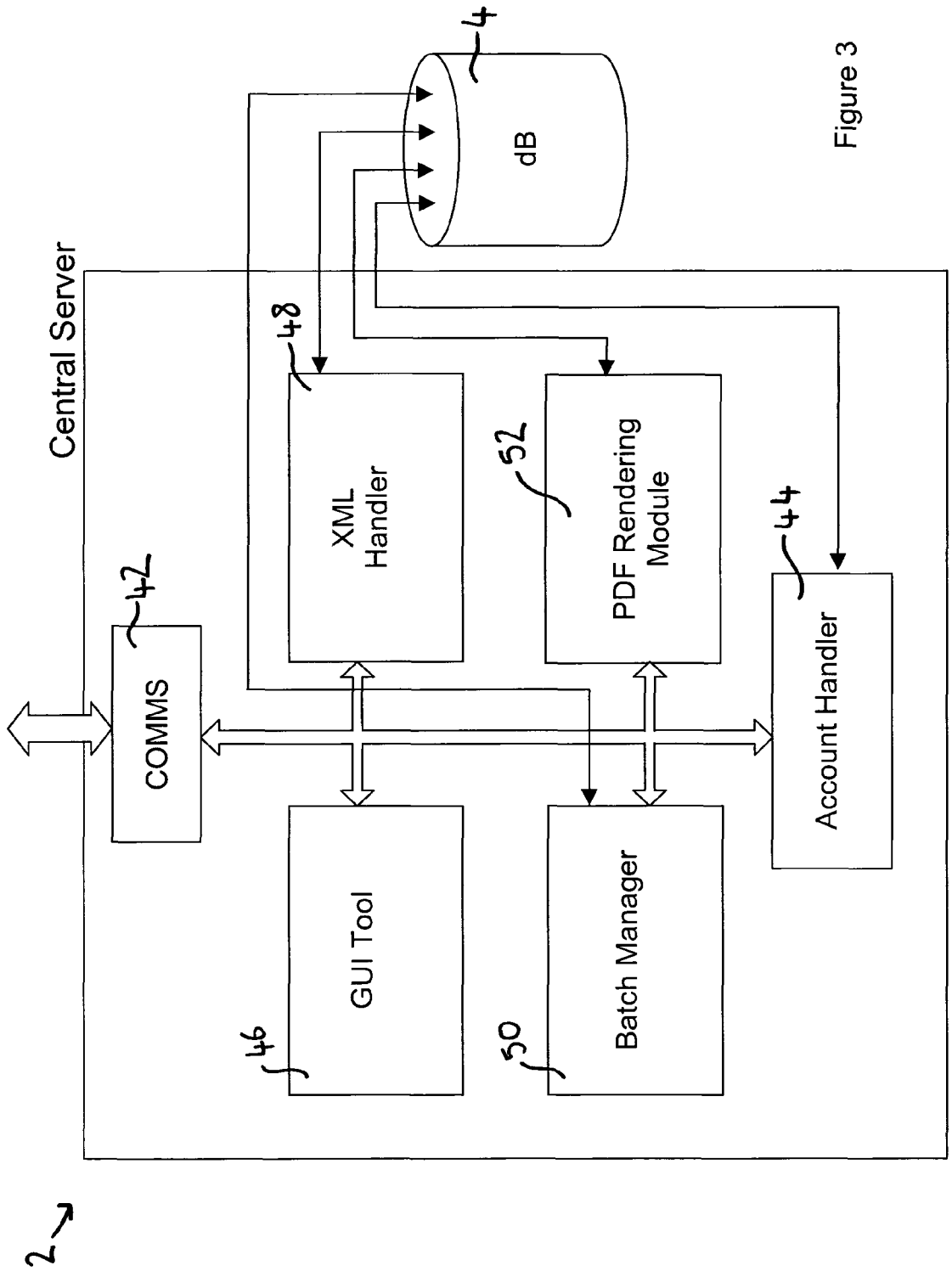
FIG. 3 is a block diagram of six main modules of the CS of FIG. 1.

Referring now to FIG. 3, the composition of the central server 2 is described. The central server 2 comprises six major components including: a communications module 42, for handling communication requests to and from the central server 2; an account handler 44, for dealing with user registration and account details; a graphical user interface (GUI) tool 46, for enabling the users to carry out steps 30 to 34 of FIG. 2 when selecting and personalising their selected products; a XML handler 48, for transforming the data generated by the GUI tool 46 into an XML file 14 for storage in the database 4; a batch manager 50, for controlling the number and position of print sets within a batch; and a PDF rendering module 52, for generating, from the XML files 14, a PDF file 20 to be transmitted to a print server 6.

Figure 4:
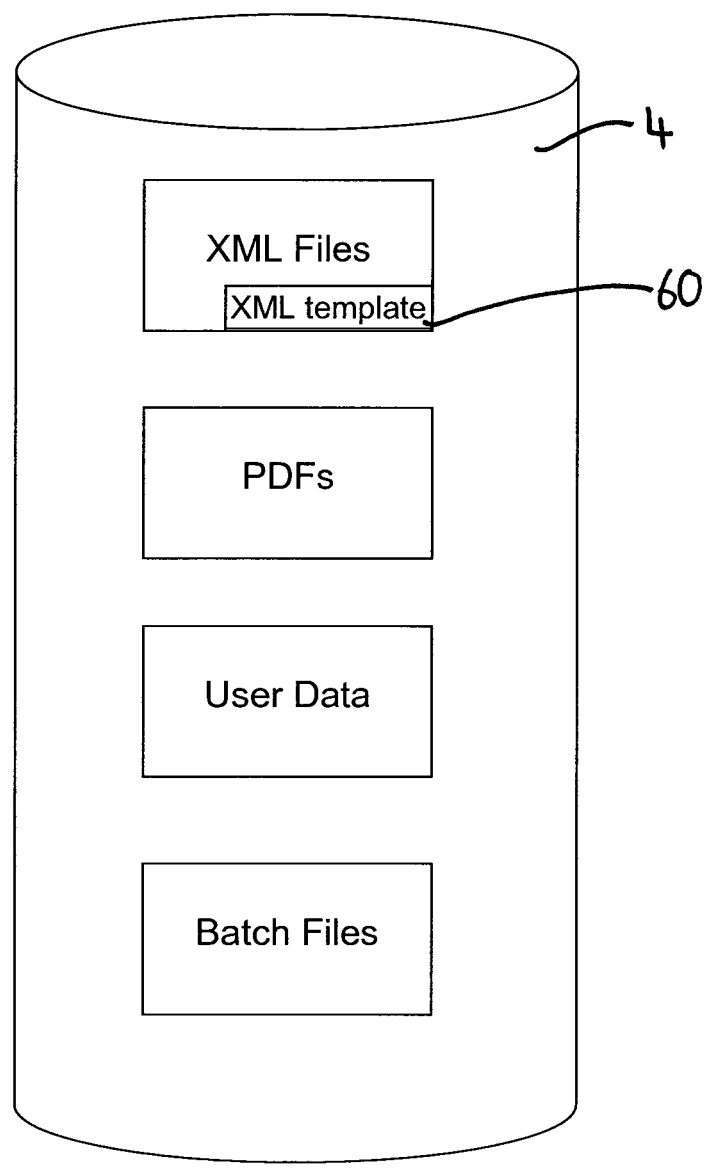
FIG. 4 is a schematic block diagram of four main sections of the database shown in FIG. 1 including an XML file section, a PDF section, a batch tables section, and a user data section.

An outline of the database 4 of FIG. 1 is shown in FIG. 4. The database 4 stores data relating to user accounts, including login information, permitting users to log into a website hosted by a web-serving element of the central server 2. The database 4 also stores: an XML template file 60, used in the generation of the XML files 14; the XML files 14 themselves; and batch tables relating to the layout of print sets within the batch.

Returning to FIG. 3, the XML files 14 are stored in the database 4 under unique print set (order) numbers. These unique print set numbers are also stored within the batch format tables together with the number of items (i.e. cards in this example) within the print set. The data within the batch tables is used when ordering the layout of print sets within the batch, as controlled by the batch manager 50, described in detail later.

Communication requests to the central server 2 are handled by the communications module 42. Similarly, all data being transmitted from the central server 2 is also sent via the communications module 42, which is connected to each of the GUI tool 46, XML handler 48, batch manager 50; and PDF rendering module 52.

The account handler 44 is arranged to handle user account creation, payment transactions, and facilitate the tracking of orders (print sets). In one embodiment, the account handler 44 is arranged to permit user access to part-complete print sets such that they may be completed and sent to the print servers 6 for printing. The account handler comprises an account creation module (not shown) for handling the set-up of accounts for new users, a user login module (not shown) for restricting access to the system to users with valid login details, and a payment handler (not shown) for handling payment transactions.

The account creation module within the account handler 44 is arranged to receive administrator/user details, including username, password and e-mail address information, which are recorded in the database 4 in order to enable users to login to the central server 2 to access and retrieve user account details relating to their orders (print sets).

The user login module within the account handler 44 is arranged to authenticate the identity of each user at login, in accordance with their username and password details, and to restrict access to the user account details which the user has the appropriate permission rights to access. The user login module is also arranged to permit the user to update their account details as necessary, for example, to change delivery or billing address details, or to reorder print sets.

The payment handler within the account handler 44 is arranged to receive and process payment details entered by the user. Payment details are recorded securely using standard payment methods.

Figure 5:
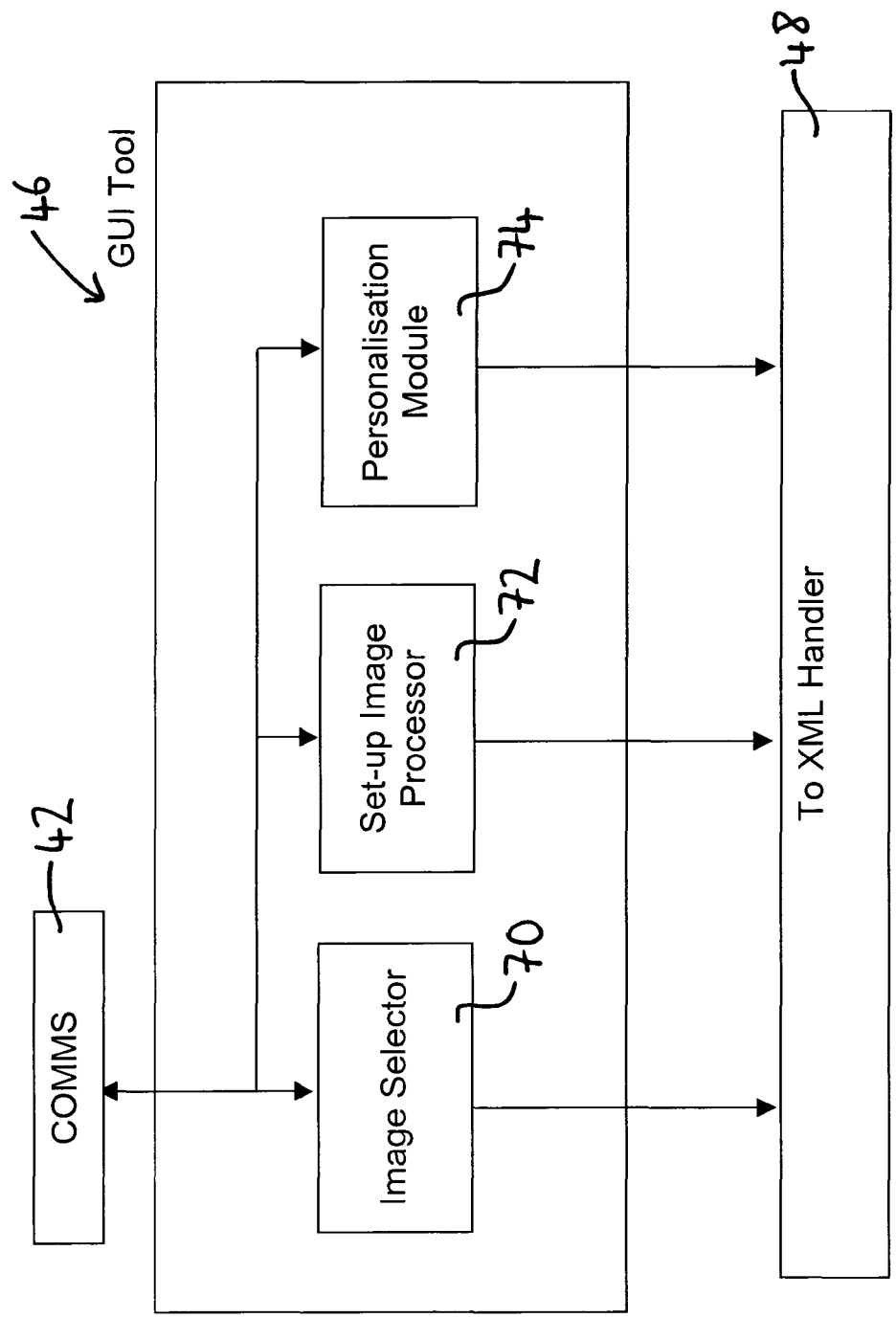
FIG. 5 is schematic block diagram of a GUI tool shown in FIG. 3.

The GUI tool 46 of FIG. 3 which is shown in more detail in FIG. 5 is configured to serve, via the web-serving element of the central server 2, a plurality of online forms, which a user interacts with, in order to select the images and text they wish to appear on their cards. Data gathered by the online forms as a result of the user interaction is passed to the GUI tool 46 for processing prior to being used by the XML handler 48 in the generation of the XML file 14 relating to the user's print set.

The GUI tool 46 comprises an image selector 70, for selecting one or more images to be printed on one or more surfaces of the cards, i.e. typically the front of the cards; a set-up image processor 72, for permitting image processing of the selected images; and a personalisation module 74, for facilitating the entry and configuration of the personalisation information to be printed on the back of the cards.

The image selector 70 is arranged to enable a user to select one or more images to appear on the cards. Where a user selects more than one image, the selected images form an image set. In one embodiment, the user uploads images (i.e. pictures or photographs) stored on a memory device associated with their user terminal 29 to the central server 2, where they are stored in an image store section of the database 4, and can be selected by the user for use in one or more image set.

In another embodiment, the image selector 70 is arranged to facilitate user selection of one or more images from one or more image host servers 10. Alternatively, the image selector enables a user to do both, i.e. upload images stored on their terminal 29 and select images from the host servers 10.

A user may select the quantity of cards, within their order, they wish to be printed with each of their selected images. Alternatively, the user may be given the option of printing equal numbers of the images within the number of cards ordered. For example, if the user is purchasing 100 cards and selects 5 images, then 20 cards will be printed of each image.

Regardless of how the images are selected, a link to each image is provided to the XML handler 48 for use in the generation of the XML file 14 relating to the user's print set. In the case where the images are selected from an image host server 10, the link is in the form of a URL pointing to the selected image. In the case where the images are uploaded to the central server 2 and stored in the database 4, the link is to the images' locations within the database 4.

The set-up image processor 72 enables each of the selected images to be processed as desired by the user. The image processing may include but is not limited to the ability: to zoom into or out of the image, by increasing the magnitude of the image; to rotate the image; to increase or decrease the contrast or brightness of the image; to alter the colours of the image, for example turning a colour photograph into black and white; to reduce defects in the image such as red-eye. It is to be appreciated that other image processing techniques may be applied to the images.

Figure 6A:
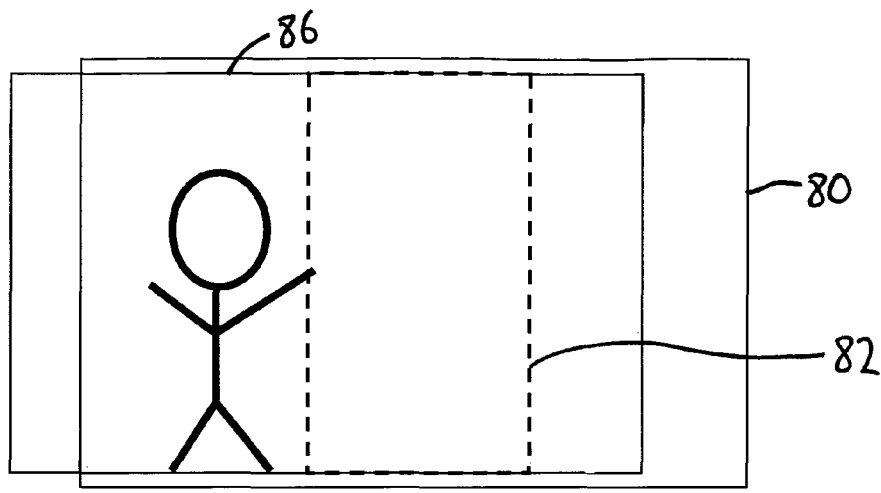
FIGS. 6a to 6c are schematic partial screenshots of an image viewing section of the GUI, showing a moveable image and a static cookie-cutter tool.
Figure 6B:
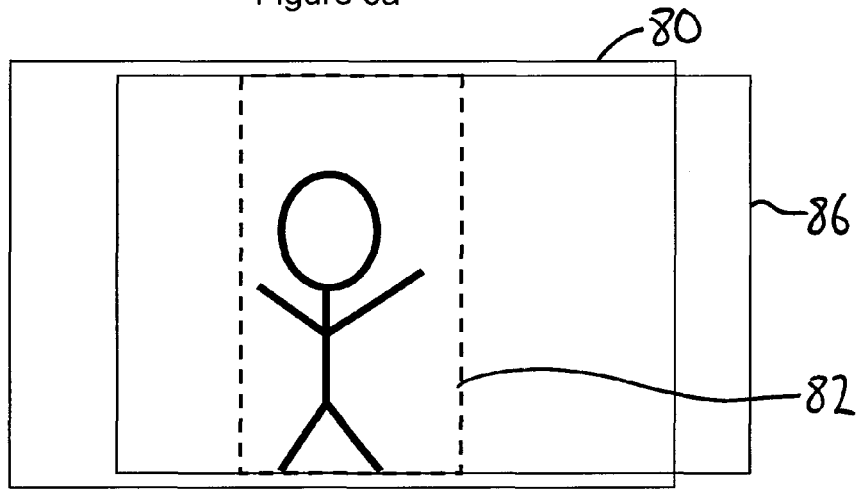
Figure 6C:
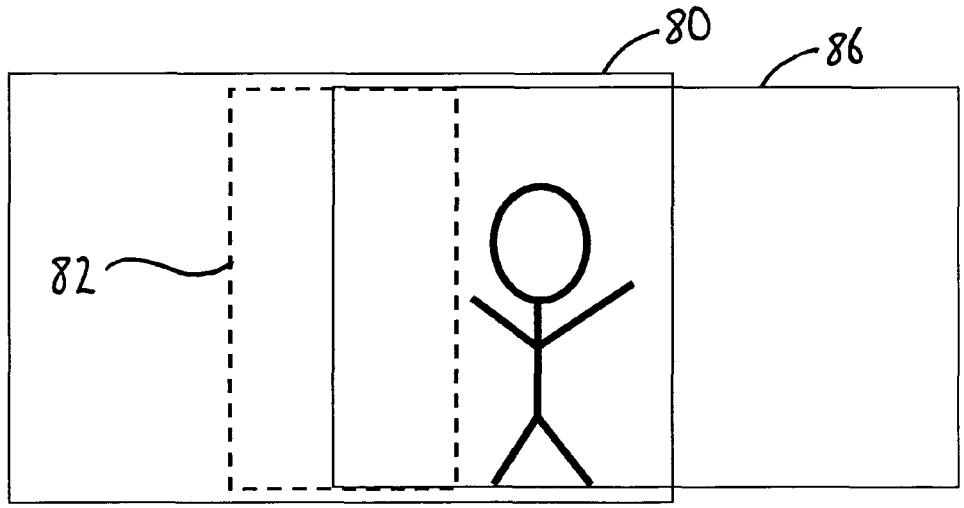

The set-up image processor 72 also includes a cookie-cutter tool in order to enable the user to select which part of a selected image should be printed on their cards. The cookie-cutter tool displays a cookie-cutter shape of the dimensions of the printed cards. Where the selected products are MiniCards, the cookie-cutter shape is rectangular although this is not the only shape which may be used. The cookie-cutter shape is displayed within an image viewing section 80 of the GUI and the user is able to move the image with respect to the cookie-cutter shape until the area of the image, falling within the cookie-cutter shape, is satisfactory. FIGS. 6a to 6c show three representations of a static cookie-cutter shape 82. As shown, the image 86 may move in relation to the cookie-cutter 82 until the area of interest within the image falls within the cookie-cutter shape 82. Alternatively, the user may be able to move the cookie cutter shape around the picture to achieve the same result.

Furthermore, the orientation of the cookie cutter shape 82 is user selectable either in a substantially vertical orientation as shown in FIG. 6a to 6c, or a substantially horizontal orientation. Alternatively, the cookie-cutter shape 82 may be selected to free-rotate around a pivot point, such that a diagonal orientation may be achieved.

The set-up image processor 72 includes a preview tool which allows a user to view their chosen images in a format and resolution similar to how the printed cards will look, allowing the user to make any further amendments to their chosen images as necessary.

Each card within the print set may comprise different images and may be treated/processed in different manners meaning that each card within the print set may be, if desired, completely unique and different to each of the other cards.

The set-up image processor 72 derives a set of image processing attributes for each card within the print set, relating to orientation, magnitude, position within image, etc, and passes this information to the XML handler 48 so that it can be incorporated into the XML file 14 for the print set.

The personalisation module 74 operates in a similar manner to the set-up image processor 72 and is concerned with the personalisation information to be printed on the front, back or both surfaces of the cards.

As one use of the cards is to convey contact information relating to the issuer of the card, in one embodiment the back of the cards is primarily associated with text content. The user can select to enter free-text which they type in using a keyboard/keypad or equivalent associated with their terminal 29.

In one embodiment, a user registers with the web-serving element of the central server 2 and is able to enter details such as their name, address, telephone number, e-mail address, and/or website address. The user may also enter nicknames or favourite quotes. This pre-entered information is stored in the database and is made available via the personalisation module 74 for selection to appear on at least one surface of one or more cards.

Figure 7:
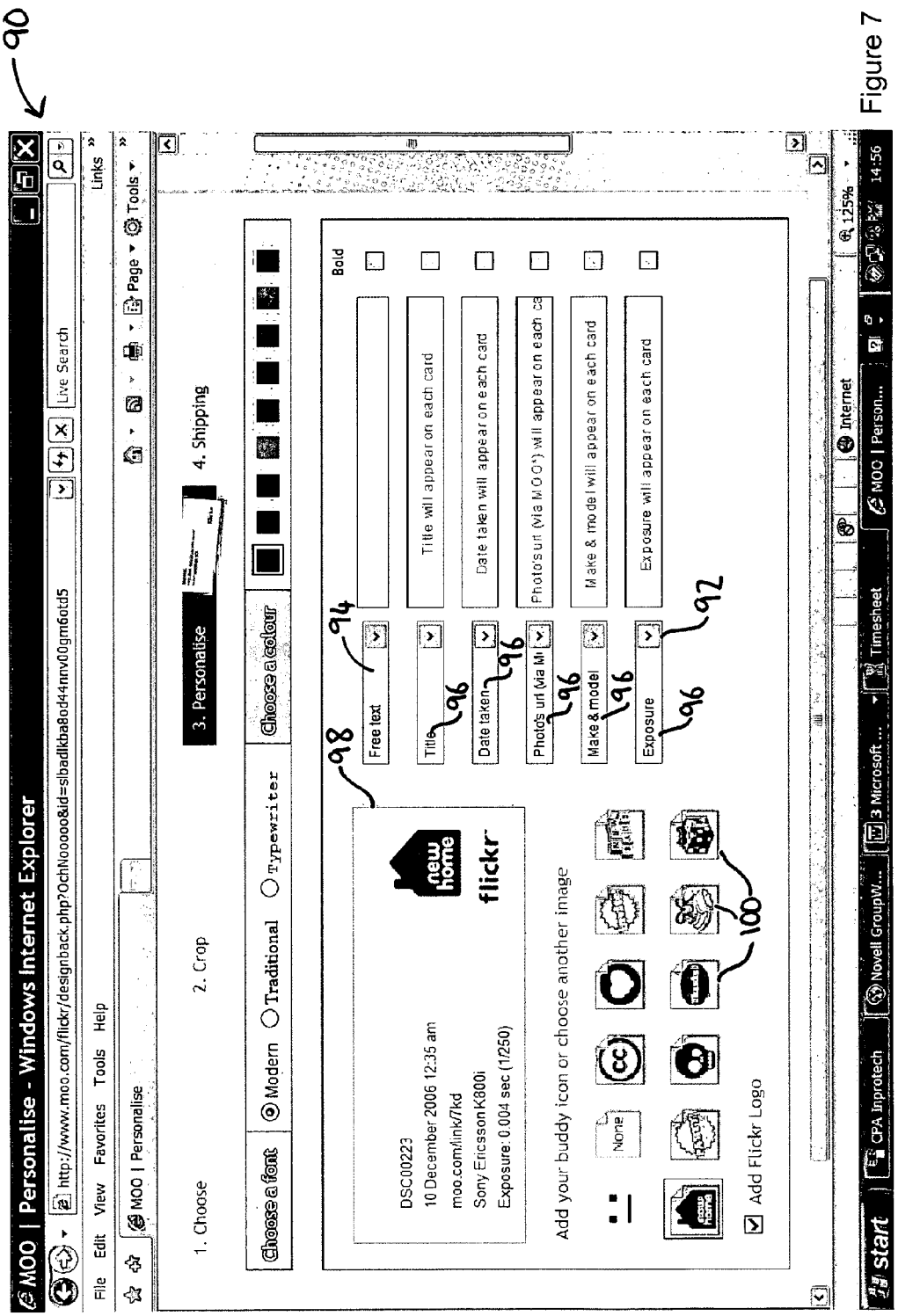
FIG. 7 is screenshot of a personalisation screen showing a plurality of text options, including metadata options.

Alternatively, where a user is selecting images from an image host server 10, personalisation information, relating to metadata associated with the chosen image, may be selected to appear on the cards. Such metadata may include but is not limited to: the title of the image, the date the image was created, the URL of the image/photograph, a statement of license, the make and model of the camera that took the photo, exposure details, ISO speed, shutter speed, and/or focal length. FIG. 7 shows a screenshot 90 of one embodiment of the present invention. As shown, a number of drop down menus 92 may be used to select either text 94 or metadata 96 to appear on the back of the card, a representation 98 of which is also shown in FIG. 7.

The personalisation module 74 also enables a user to select a font type, size and colour, a text orientation, and other text attributes such as bold, italics and underline for each item of text.

A user may select a colour or pattern to cover the back of each card. Alternatively, further images may be added to the back of the cards. The image may selectably cover the whole of the back of the card, and/or a user may select one or more icons to appear on the back of the cards. FIG. 7 shows a number of icons 100 which may be added to the card and which are indicative of the intended use for the cards, e.g. to invite the recipients to an event.

In one embodiment, different personalisation information may be assigned to each card within the print set, or to a plurality of cards in the print set. In a further embodiment, the personalisation information may be the same for each card in the print set. This latter embodiment advantageously simplifies the order process for the users.

The GUI tool 46 passes the link to the image, the image processing attributes and personalisation information relating to each card to the XML handler 48, where an XML file 14 is generated for the whole print set. The information from the GUI is referred within this description as print set data and comprises the following:

Card #001
    Surface 1
        Link to image/colour
        Cookie-cutter orientation
        X/Y coordinates of cookie-cutter position in relation to an origin position of the image
        Magnification factor
        Image rotation variable
        Image processing variables, i.e. contrast, brightness etc
    Surface 2
    Personalisation #1
        Glyph—image/text/link to metadata
        X/Y coordinates of image/text
        Orientation of text
        Font style and size
        Text colour
    Personalisation #2
        Glyph-image/text/link to metadata
        X/Y coordinates of image/text
        Orientation of text
        Font style and size
        Text colour
Card #002

Figure 8:
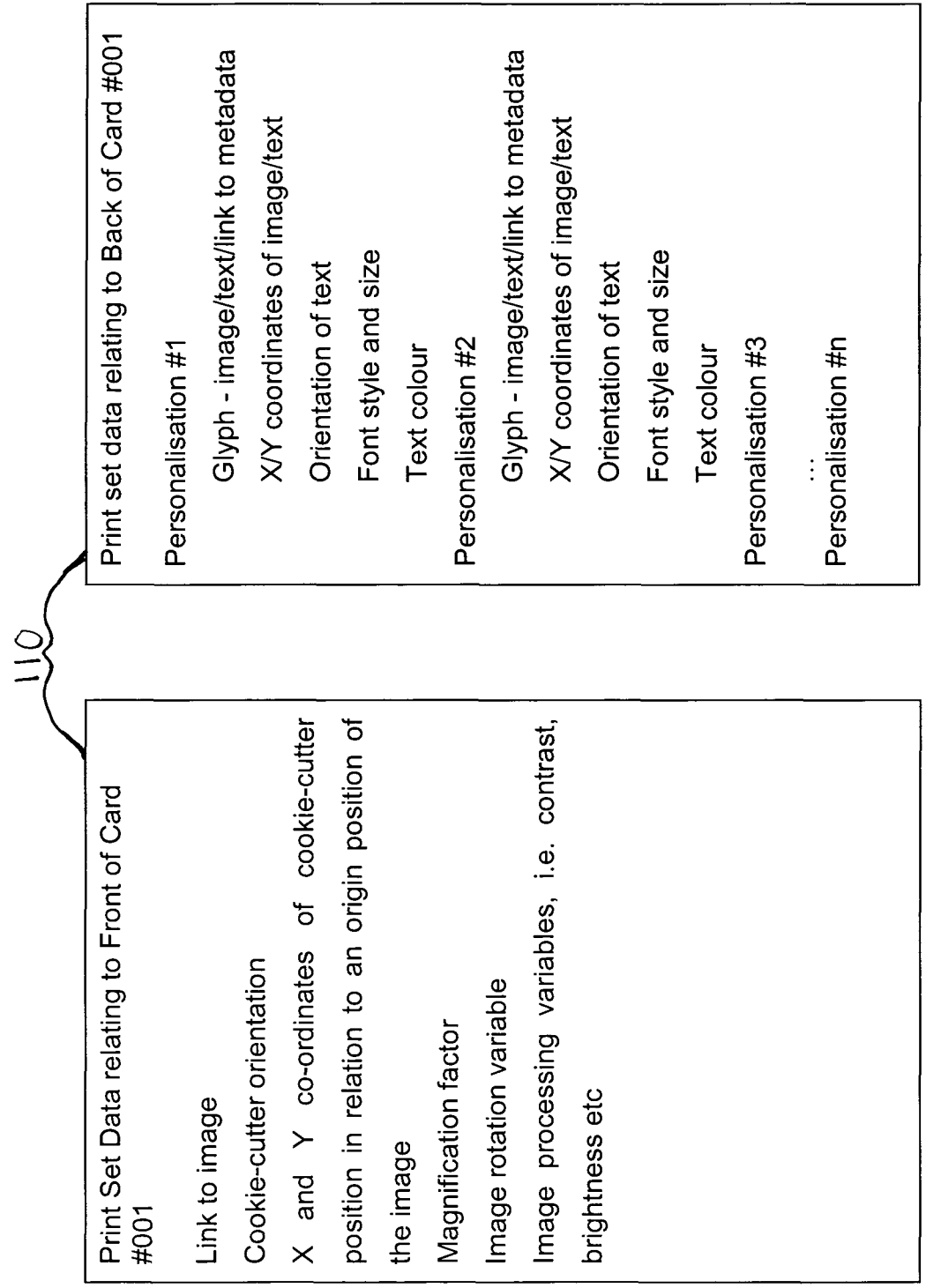
FIG. 8 is a schematic layout of print set data, passed to a XML handler shown in FIG. 3, the schematic layout representing the relationship between the print set data and a card to which the print set data is to be applied.

FIG. 8 shows a representation 110 of the print set data passed to the XML handler 48, in relation to how the print set data relates to the card itself. It is to be appreciated that the print set data need not be sent from the GUI tool 46 to the XML handler 48 collectively, rather the print set data may be sent sequentially.

Figure 9:
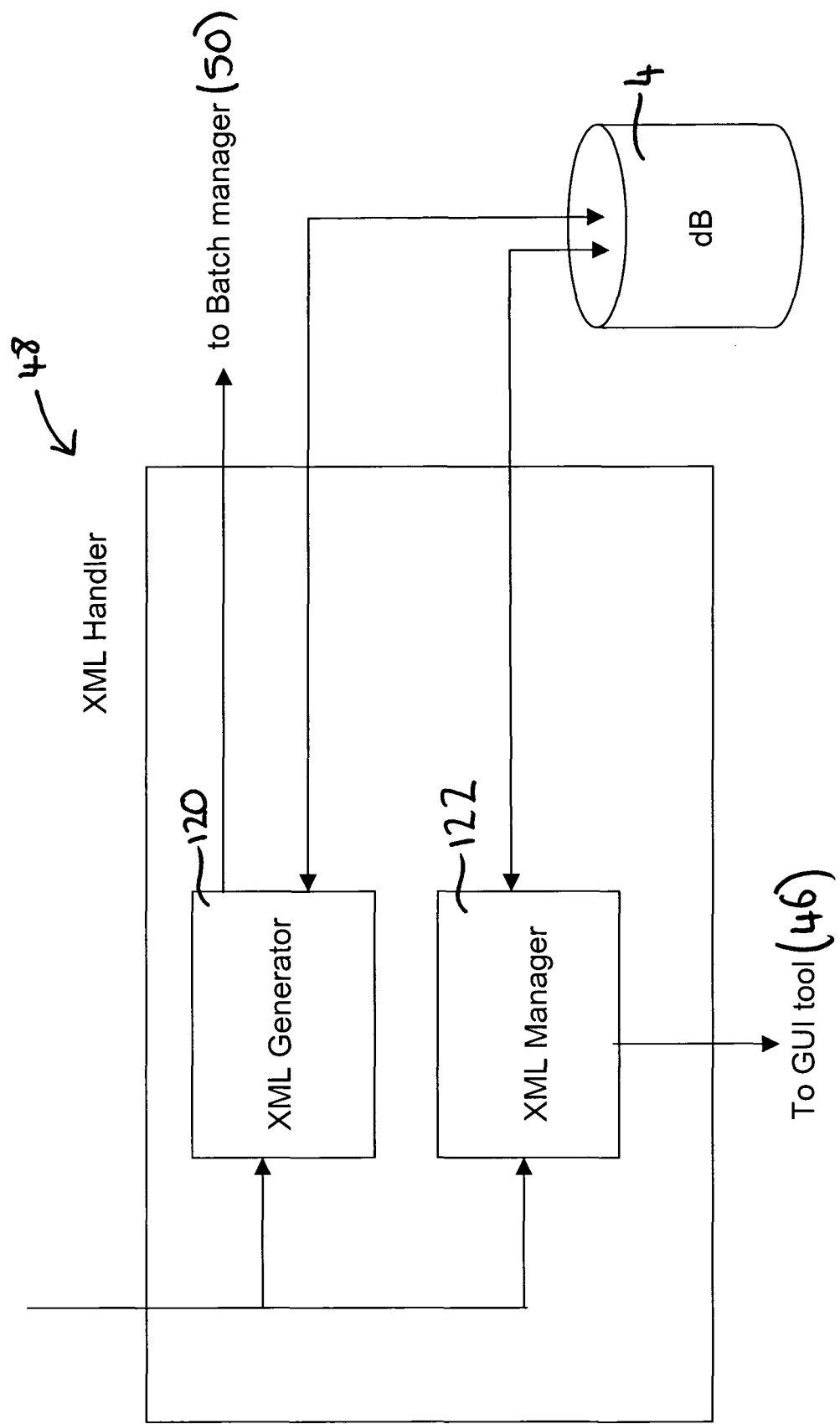
FIG. 9 is a schematic block diagram of the XML handler shown in FIG. 3.

As shown in FIG. 9, the XML handler 48 comprises an XML generator 120 for generating an XML file 14 for each print set and an XML manager 122 for managing the XML files 14.

The XML generator 120 composes an XML file 14 using the XML template 60 retrieved from the database 4 and the print set data received from the GUI tool 46 (listed above).

A new XML file 14 is created and saved upon completion of each new print set. At that stage, the generated XML file 14 is stored in the database 4 in accordance with the assigned unique print set number such that the XML file 14 for each print set can be retrieved easily by looking-up the unique print set number from within the database 4.

The XML generator 120 also communicates with the batch manager 50 (described below) each time a complete print set is created and saved such that the batch manager 50 monitors the number of print sets within any one batch in order to initiate printing of the print batch when complete.

In one embodiment, the central server 2 facilitates saving part-complete XML files upon user selection, so that users can return to their order (print set) at a later time for completion. Part-complete print sets are also saved in relation to their assigned unique print set, for ease of retrieval. However, part-complete sets are stored in a separate location within the database 4 such that part complete-print sets are distinguished from complete print sets (for which payment has been received) which are to be printed upon completion of the print batch. It is to be appreciated that part-complete print sets will not be saved indefinitely.

The XML manager 122 permits the retrieval of part-complete and complete print sets such that the GUI tool 46 can use the information within the XML files 14 to display either part-complete orders or complete orders to a logged-in user. This enables the user to complete the order process, or to recall a previous order, such that a repeat order can be carried out. When recalling a previous order, the GUI tool 46 enables the previous order to be amended as the user wishes and is saved in relation to a new unique print set number as a complete print set when payment has been facilitated.

The XML generator 122 creates the XML file 14 for the print set by transposing the print set data from the GUI into segments of XML code relating to each surface of each card. Within the XML file 14, additional information is provided regarding the print set.

The XML handler 48 is also passed additional information relating to the print set from the GUI tool 46, including the number of cards within the print set, the delivery details (including name and address), and the unique print number. The number of cards within the print set, and the delivery details are used by the batch manager 50 when ordering the print sets within the batch, as described below. However, the delivery details and the unique print number are used in the creation of a top card within the print set.

In one embodiment, all of the cards within the print set are compiled vertically into the PDF of the print batch forming a column (all cards within the print set being stacked on top of each other). This is advantageous because when the cards are printed, cut and trimmed, all of the cards within the order are collectively sitting in one column, without the need for a dedicated collation step. Another advantage of cutting the cards in columns is that each card is exactly the same size, and because the cards are packaged and shipped in stacks (columns) this gives the cards a better quality finish than if there are even very slight differences in the size of the cards, which may result if the cards where not cut in columns.

Figure 10:
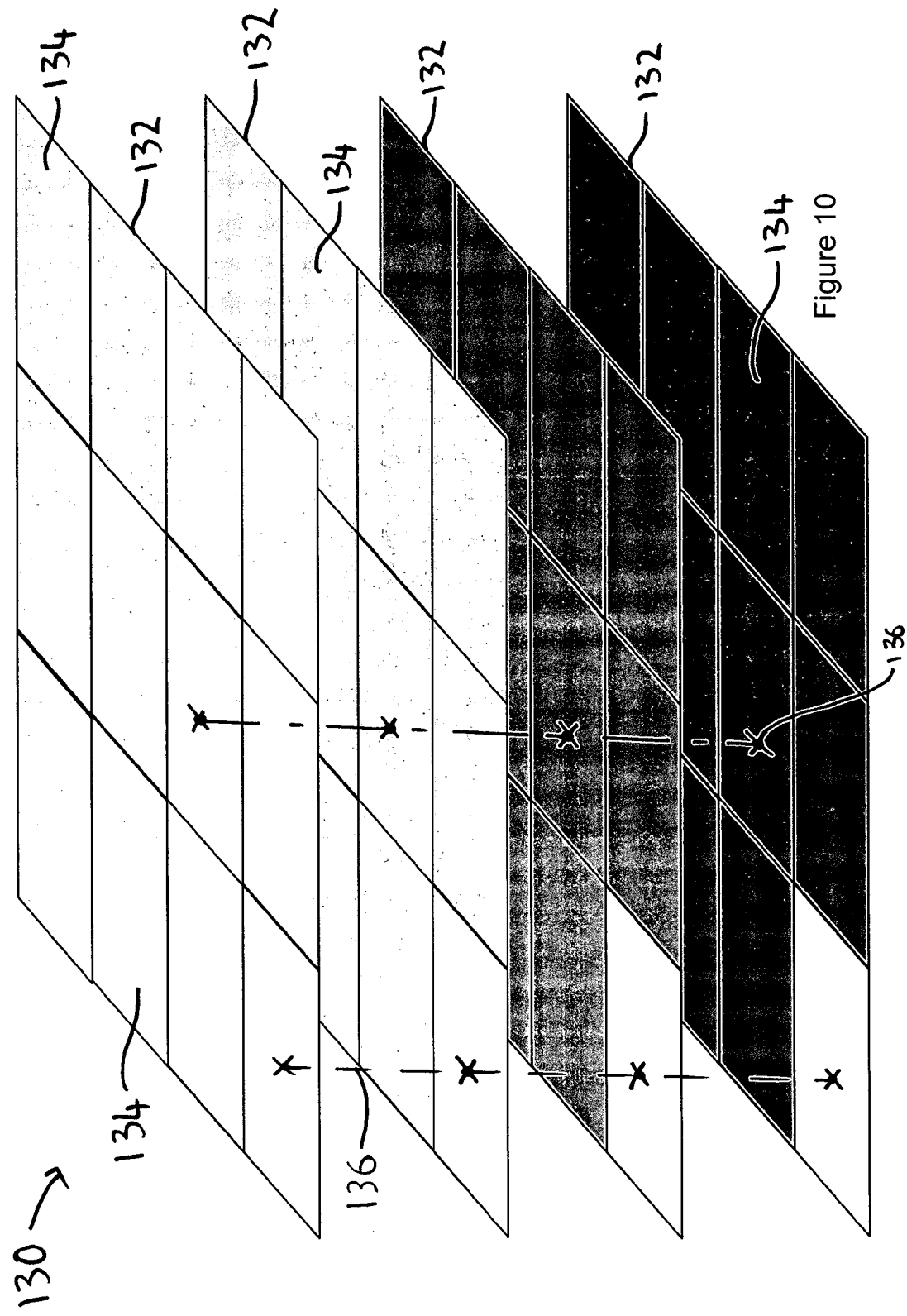
FIG. 10 is a schematic layout of a stack of sheets within a print batch.

FIG. 10 shows an example stack 130 of a plurality of sheets 132 of printable material (card) stacked on top of each other: each sheet being divided into a plurality of card segments 134. It is to be appreciated that each sheet is printed individually, front and back, and once all of the sheets within the print batch have been printed, they are collected together as a stack, which is then cut and trimmed as required into columns 136 of cards.

The XML manager 122 also enables a user to arrange the order of the cards 134 within the print set as desired through a technique named clustering. Clustering enables the cards to be ordered using any variable within the print set data. For example, the set-up image processor can determine the average colour for each image, and the XML manager 122 can rearrange segments of XML code relating to each card such that the complete print set can be ordered in accordance with the average colour of the cards, i.e. creating a rainbow effect. Alternatively, where the personalisation information of cards within a print set includes the date on which each image/photograph was taken, the XML manager 122 can rearrange the XML code segments in chronological order. It is to be appreciated that the clustering functionality may use any variable within the print set data for a given print set. Furthermore, the top card is not used in clustering when reordering the cards within the print set.

The batch manager 50 is arranged to order the completed print sets within the configured print batch. As stated above, the size of a print batch is predetermined because the number of cards which fit on to one sheet of print material (i.e. card) is known, and the number of sheets within the print batch is configurable and therefore known.

Figure 11:
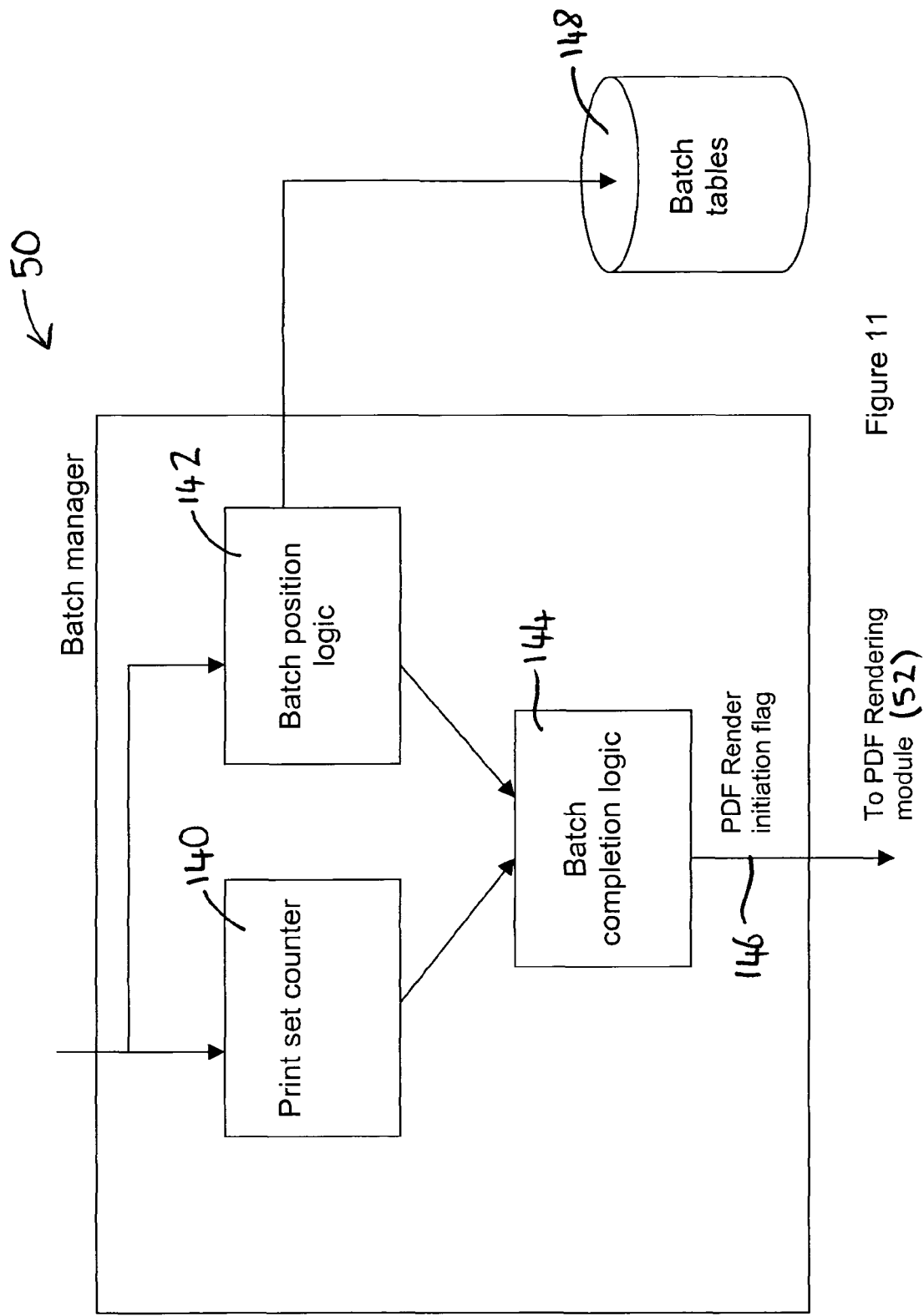
FIG. 11 is a schematic block diagram of a batch manager shown in FIG. 3.

The batch manager 50, as shown in FIG. 11, comprises a print set counter 140 for counting the number of print sets within the print batch, a batch position logic module 142 for determining the best position within the print batch for each print set, and a render completion logic module 144 for generating a PDF render initiation flag signal 146 when the print batch is complete. The batch position logic module 142 accesses a batch table database 148 which makes a record of the location of each print set within the print batch.

Figure 12:
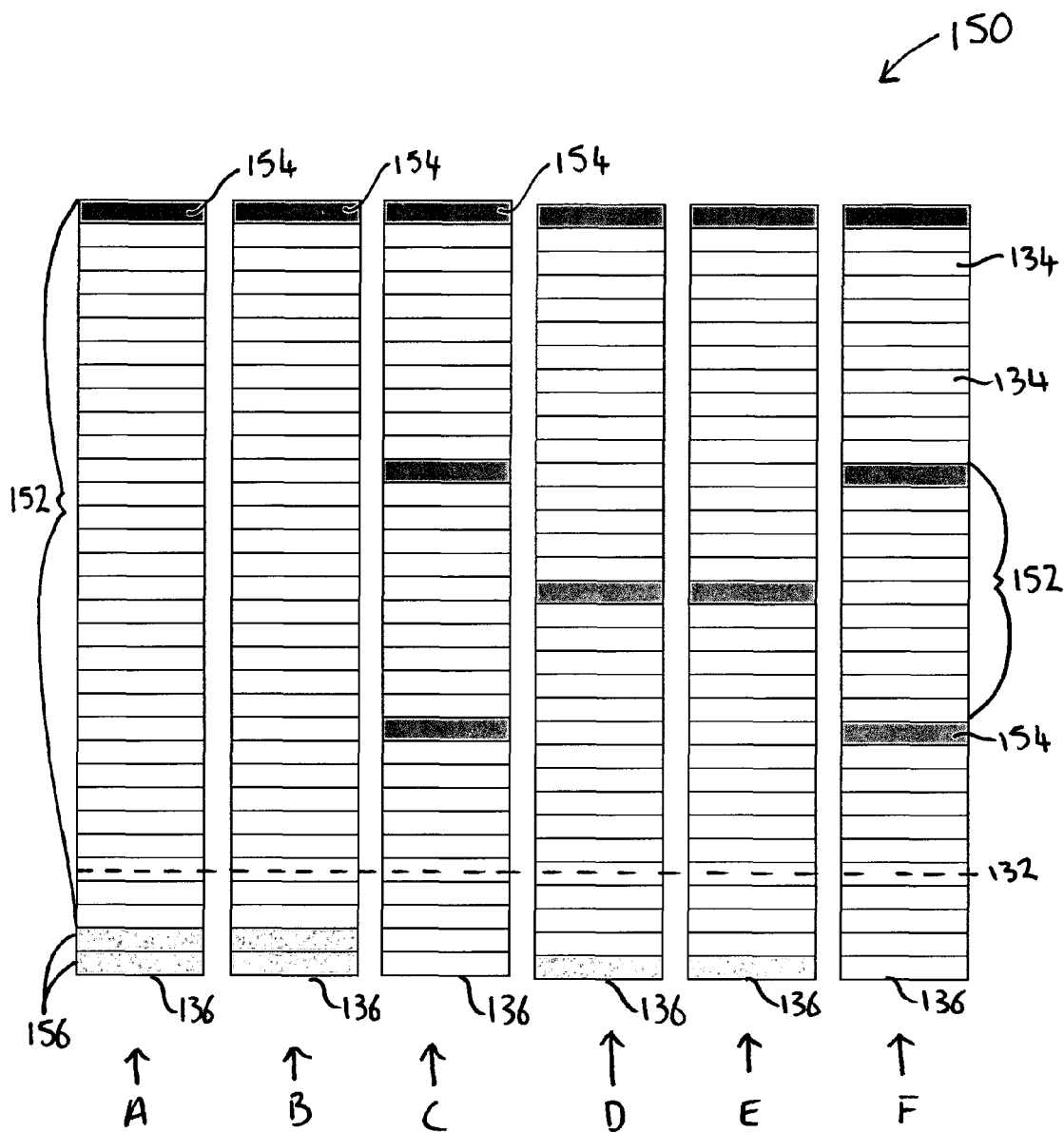
FIG. 12 is a schematic diagram of a print batch showing twelve print sets.

FIG. 12 shows a side view of a print batch 150 being six columns 136 wide, and thirty three sheets high. For simplicity in this example the batch will be considered as being only one column 136 deep, meaning that every card 134 within the batch is represented in FIG. 12. Each print set 152 in FIG. 12 has an associated top card 154.

As each print set 152 is ordered by users, the XML file 14 relating to that print set 152 is added to the database 4. Information within the XML file 14 relating to the unique print order number, number of items within the print set 152 (including the top card 154) and delivery details are passed to the batch manager 50.

The print set counter 140 tracks the number of print sets 152 and cards 134 within each print set 152, and the batch position logic module 142 contains rules which assigns positions within the batch in relation to the 'spaces' yet to be filed. As shown in FIG. 12 columns A and B contain print sets 152 totalling 30 cards, columns C and F both contain three print sets 152, each totalling 10 cards, and columns D and E both contain two print sets 152, each of 15 cards. The batch position logic module 142 places print sets 152 within the stack in relation to the number of cards in the print set 152, such that if column C contained two print sets of 10 cards each, when a new print set of 10 cards is ordered, the rules within the batch position logic module 142 determine that when the new print set order is received that its position will be within the column, column C, holding the other two print sets of 10 cards each.

The rules may be configured to ensure the most efficient use of the batch 150. As shown in FIG. 12, due to the variations in numbers of cards 134 within the print sets 152, there are a small number of blank cards 156. There may be other uses for these blank cards 156, i.e. advertisements, competitions or promotions, and these so called blank cards 156 can be included with certain print sets distributed to the users.

The top card 154 in the stack sits on top of the print set 152 and is configured to include the delivery details for that print set. The top card of each print set may be colour coded to provide additional information regarding the print set. For example, if print sets contain different quantities of cards, i.e. less than the number of sheets within the print batch, the top card of such a print set (visible at the top of the print batch) is given a different colour than that of a print set which is the size of the number of sheets in the print batch. Therefore, it is easy to identify when packing the cards the size of the print sets from the top card. For example, print sets containing 100 cards may have a pink top cards, while print sets of 10 cards have a top card which is green. Also, it is possible to group multiple print sets being delivered to the same address in this manner.

In addition, the top card 154 may also include a bar code relating to the unique print set (order) number, for allowing tracking of the print set once it has been printed. For example, scanning the bar code of one print set within a batch means that the whole batch has been printed and confirmation e-mails may be sent to each user who has a print set with the batch associated with the scanned print set: the confirmation e-mails being used to let the user know that their print set has been printed and is on route to it's delivery address.

The rules are also configured to place print sets 152 having the same delivery details next to each other in the batch as this offers the advantage that at the packaging stage, which is typically performed by human hand, the print sets 152 going to the same address are logistically easier to process, pack and post.

When the batch position logic 142 has determined the best position for each print set 152, a record of the unique print set number, column number and top card position number are stored in the batch tables 148 for use by the PDF rendering module 52 when it renders the XML files 14 into the PDF 20 for printing.

It is to be appreciated that the batch position logic module 142 is able to dynamically relocate the positions of print sets 152 within the print batch 150 as new print set orders are received, and as such the data stored within the batch tables 148 is updated as necessary.

Signals from the print set counter 140 and batch position logic 142 are passed to the batch completion logic module 144, which uses the data passed to it, and the known volume of the print batch 150 to ascertain whether the batch is complete. If the batch is complete, the batch completion logic module 144 generates the PDF render initialisation flag signal 146, which is the signal used by the PDF rendering module 52 to initiate rendering of the PDF 20 to be sent to the print server 6.

Figure 13:
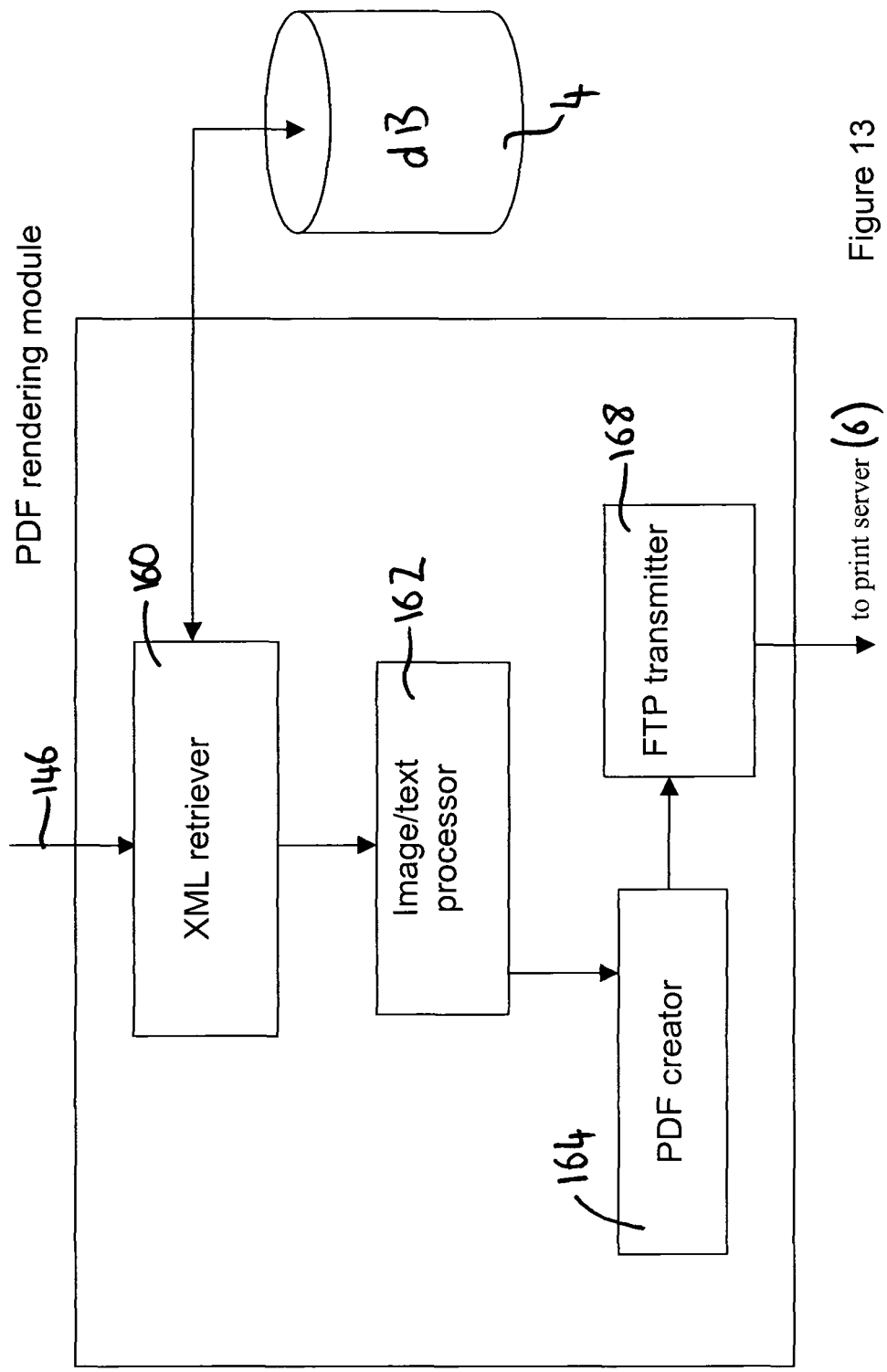
FIG. 13 a schematic block diagram of a PDF rendering module as shown in FIG. 3.

As shown in FIG. 13, the PDF rendering module 52 comprises: an XML retriever 160, for retrieving all of the XML files 14 for each print set 152 within the completed batch; an image/text processor 162, for carrying out image processing steps in accordance with the print set data within the XML files 14 in order to generate images for the front and back of each card; a PDF creator 164, for taking the generated images and positioning them within a PDF matrix in accordance with positional information within the batch tables; and an FTP transmitter 168, for transmitting the PDF matrix to the print servers 6 for printing.

In use, the XML retriever 160 receives the PDF render initialisation flag signal 146 and upon receipt, the XML retriever 160 looks up the batch table relating to the present batch in order to identify all of the XML files 14 within the batch. The XML retriever 146 is arranged to retrieve each of the XML files 14 sequentially to be passed to the image text/processor 162. The XML file 14 contains all of the information required for the image/text processor to carry out the required image processing steps to generate the images the user selected for each of the cards within their print set, i.e. the XML file 14 contains a list of instructions which are to be carried out in order to generate the image the user selected, i.e. the instructions relating to where the image(s) are to be retrieved from, where the cookie-cutter shape is in relation to the selected image, and other instructions regarding magnification, rotation, personalisation information etc.

Typically, the images retrieved from host image servers are of the highest image resolution available. It is to be appreciated that the GUI tool may not use the highest available image resolution when providing a preview to the user.

The PDF creator 164 takes the generated images and places them at the correct position (X/Y coordinates) within the print batch, in accordance with the positional information within the batch tables.

When the PDF matrix is complete it is passed to the FTP transmitter 168 which is arranged to transmit the PDF matrix to a chosen one of the print servers 6 for printing. In one embodiment, the chosen one of the print servers is determined by the regional delivery addresses for the print sets within the batch. For example, a print server 6 located at a printing press situated in Germany may be used for all European print sets ordered, while a print server located at a printing press in the US may be used for all US print sets ordered. It is to be appreciated that the batch position logic module contains rules which ensure that print sets will be assigned positions within one of a plurality of batches in accordance with the intended delivery region.

In one embodiment, there may be a predetermined delay between the batch being completed and being generated into a PDF to be sent to the print servers. This delay provides a cooling-off period for users who have placed their orders prior to printing such that they can amend their order if necessary.

It is to be appreciated that the print sets within a print batch need not be configured in columns, since the collation of print sets is possible when the print sets are ordered in rows or multiple rows within the sheets of the print batch, and when the print sets span multiple sheets.

Furthermore, it is to be appreciated that it is not essential to use XML files to store print set data for recreating images desired by the user since the central server could be arranged to save the user's desired image as individual PDFs or other image files which can be combined when creating the PDF matrix.

The invention claimed is:

1. A system for generating an electronic document for use in a printing process, wherein the electronic document comprises a plurality of printable sheets, each printable sheet comprising an array of printable regions, the system comprising a programmed computing apparatus, wherein the computing apparatus is programmed:

to receive content for each of a plurality of users;

to assign a selection of printable regions for each user in dependence on the received content for each user and to assign the content for each user amongst the selection of printable regions assigned to that user, wherein the content for each user varies across the selection of printable regions assigned to that user, wherein the selection of printable regions is made such that one or more users are assigned corresponding regions on each printed sheet of the plurality of printable sheets, adapted such that on printing, said corresponding regions form a print set for one of said users extending through the plurality of printable sheets to comprise a plurality of printed items on printing of the printable sheets, and wherein the content for each said user varies throughout said print set so that a print set is formed such that at least some of the printed items have different content from other printed items in the print set.

2. The system as claimed in claim 1, wherein the content comprises region specific content that is specific to each printable region within the selection of printable regions.

3. The system as claimed in claim 2, wherein the region specific content comprises image data and format information.

4. The system as claimed in claim 1, wherein content is stored on a remote server and the computing apparatus is further arranged to receive a link to the content stored on the remote server such that the computing apparatus can access the content.

5. The system as claimed in claim 1, wherein the computing apparatus is arranged to receive a plurality of content files from a remote terminal of a user.

6. The system as claimed in claim 5, further comprising a data store for storing the received content files in a database.

7. The system as claimed in claim 6, wherein content is stored on a remote server and the computing apparatus is further arranged to receive a link to the content stored on the remote server such that the computing apparatus can access the content and the links are to the received content files stored in the database.

8. The system as claimed in claim 6, wherein the links are URLs of content files stored at the remote server.

9. The system as claimed in claim 8, wherein the URL links include links to metadata associated with each content file.

10. The system as claimed in claim 5, wherein the content files comprise image files.

11. The system as claimed in claim 10, the computing apparatus further comprising: a graphical user interface (GUI) tool arranged to permit user selection of the content; and an image processor arranged to permit user selection of one or more image processing techniques to be applied to an image specified in the image files.

12. The system as claimed in claim 11, wherein image processing techniques are selected from a group comprising: magnification, rotation, contrast control, brightness control, colour control, red-eye reduction.

13. The system as claimed in claim 10, the computing apparatus further comprising a graphical user interface (GUI) tool arranged to permit user selection of the content, wherein the GUI tool is arranged to store the content for each printable region as a complete image.

14. The system as claimed in claim 1, the computing apparatus being further programmed to provide a graphical user interface (GUI) tool arranged to permit user selection of the content.

15. The system as claimed in claim 14, wherein user selection of content comprises user selection of a plurality of images, the system further comprising an image portion selection tool for enabling user selection of a printable portion of each of the selected plurality of images wherein the printable portion equates to a printable region.

16. The system as claimed in claim 14, wherein the GUI tool is arranged to permit a user to indicate that they have not finished selecting content, the GUI tool being further arranged to store the content selected at that stage, such that at a later time the content can be retrieved in order to facilitate completion of content selection by the user.

17. The system as claimed in claim 1, wherein the computing apparatus is programmed to provide a personalisation tool arranged to permit personalisation content to be added to at least one of the printable regions.

18. The system as claimed in claim 17, wherein the personalisation content is selected from one or more of the group comprising: an image, an icon, free text, text from metadata associated with a related content file, text stored in a user data section of the database, and symbols.

19. The system as claimed in claim 17, wherein the personalisation tool is arranged to permit the user to specify a format for the personalisation content by selecting personalisation content attributes selected from the group comprising: font type, font style, font size, and font colour.

20. The system as claimed in claim 17, wherein the personalisation content comprises at least one personalisation element, and wherein the personalisation tool is arranged to permit user selection of an X/Y co-ordinate of the personalisation element within the printable region.

21. The system as claimed in claim 20, wherein the personalisation tool is arranged to permit user selection of an orientation of the personalisation element within the printable region.

22. The system as claimed in claim 1, wherein all of the printable regions assigned to a user contain a portion of identical content.

23. The system as claimed in claim 1, the computing apparatus further comprising: a content collation tool arranged to collate content for each of the printable regions within the selection of printable regions; and a data store for storing the collation of content for the selection of printable regions.

24. The system as claimed in claim 23, wherein the content collation tool collates the content into an XML file associated with the group of printable regions, and wherein the XML file is stored in the data store.

25. The system as claimed in claim 24, the computing apparatus being programmed to provide a position assigner arranged to assign an optimal position for the selection of printable regions, assigned to each user, within the electronic document, such that the optimal position for each user forms a specified order throughout the electronic document, the specified order being determined to enhance collection of the selection of printable regions at the end of the printing process.

26. The system as claimed in claim 25, wherein the collation tool determines user requisition information comprising delivery data and the number of printable regions in the selection of printable regions, such that the position assigner is further arranged to assign optimal positions for each selection of printable regions within the electronic document in dependence on the delivery data and number of printable regions of a plurality of users.

27. The system as claimed in claim 25, wherein the position assigner is arranged to record the optimal positions for each user in a data store, and wherein the position assigner is further arranged to dynamically amend the specified order depending on the users that have content within the electronic document.

28. The system as claimed in claim 25, wherein the collation tool is arranged to use the batch order information to generate a primary printable region containing an indication of the delivery data and a unique user ID to facilitate tracking of printable regions throughout the printing process.

29. The system as claimed in claim 1, the computing apparatus further comprising a position assigner arranged to assign an optimal position for the selection of printable regions, assigned to each user, within the electronic document, such that the optimal position for each user forms a specified order throughout the electronic document, the specified order being determined to enhance collection of the selection of printable regions at the end of the printing process.

30. The system as claimed in claim 1, wherein the computing apparatus is programmed to organise the content within the selection of printable regions upon user selection of a desired layout of content.

31. The system as claimed in claim 1, wherein additional content is applied to printable regions which are not assigned to a particular user, the additional content being selected from the group comprising promotional, advertising, and competition related content.

32. The system as claimed in claim 1, wherein the electronic document is a PDF file.

33. The system as claimed in claim 1, wherein the computing apparatus is programmed to transmit the electronic document to a remote print server using standard File Transfer Protocols for completion of the printing process.

34. The system as claimed in claim 33, wherein there is a time delay between assigning content a position within the electronic document and transmitting a completed electronic document to the print server.

35. A system for generating printed documents comprising the system for generating an electronic document for use in a printing process as claimed in claim 1, further comprising:
   a printer arranged to print the electronic document, comprising the plurality of printable areas, on to a plurality of sheets of printable material to form a printed document,
   stacking apparatus arranged to place the printed sheets of the printed document in a stack formation, and
   a cutter arranged to cut the printable areas into their printable regions, to form columns of printed items forming a print set,
   wherein the selection of printable regions are placed within one column of printable regions such that the collection of the selection of printable regions is optimised.

36. The system as claimed in claim 1, wherein the content is assigned to both sides of the plurality of sheets.

37. A system as claimed in claim 1, wherein the computing apparatus is programmed to assign a selection of printable regions for each user such that the content contained within the arrays of at least two adjacent sheets is different to one another.

38. A method of generating an electronic document for use in a printing process, wherein the electronic document comprises a plurality of printable sheets, each printable sheet comprising an array of printable regions, the method comprising:
   receiving content for each of a plurality of users;
   assigning a selection of printable regions for each user in dependence on the received content for each user; and
   further assigning the content for each user amongst the selection of printable regions assigned to that user,
   wherein the content for each user, varies across the selection of printable regions assigned to that user, wherein the selection of printable regions is made such that one or more users are assigned corresponding regions on each printable sheet of the plurality of printable sheets, adapted such that on printing, said corresponding regions form a print set for one of said users extending through the plurality of printable sheets to comprise a plurality of printed items on printing of the printable sheets, and wherein the content for that user varies throughout said print set such that at least some of the printed items have different content from other printed items in the print set.

39. A method of printing a print set of printed documents comprising the method of generating the electronic documents as claimed in claim 38 and further comprising:
   printing the electronic document, comprising the plurality of printable areas, on to a plurality of sheets of printable material to form a printed document,
   stacking the printed sheets of the printed document in a stack formation, and
   cutting the printable areas into their printable regions to form columns of printed items forming a print set.

* * * * *